US009075475B2

(12) United States Patent
Mak-Fan et al.

(10) Patent No.: US 9,075,475 B2
(45) Date of Patent: Jul. 7, 2015

(54) PORTABLE ELECTRONIC DEVICE INCLUDING TOUCH-SENSITIVE DISPLAY AND METHOD OF DETERMINING WHEN TO TURN OFF THE TOUCH SENSITIVE DISPAY

(71) Applicant: BLACKBERRY LIMITED, Waterloo (CA)

(72) Inventors: David James Mak-Fan, Waterloo (CA); Lawrence Edward Kuhl, Waterloo (CA); Alon Shenfield, Richmond Hill (CA); Thomas James Crugnale, Kitchener (CA); Darcy Phipps, Waterloo (CA)

(73) Assignee: BLACKBERRY LIMITED, Waterloo (CA)

( * ) Notice: Subject to any disclaimer, the term of this patent is extended or adjusted under 35 U.S.C. 154(b) by 0 days.

(21) Appl. No.: 14/223,491

(22) Filed: Mar. 24, 2014

(65) Prior Publication Data
US 2014/0204044 A1    Jul. 24, 2014

Related U.S. Application Data

(63) Continuation of application No. 12/817,984, filed on Jun. 17, 2010, now Pat. No. 8,717,311.

(60) Provisional application No. 61/218,715, filed on Jun. 19, 2009.

(51) Int. Cl.
G06F 3/041    (2006.01)
G06F 1/32    (2006.01)
G06F 3/0488    (2013.01)
H04R 3/02    (2006.01)

(52) U.S. Cl.
CPC ............ *G06F 3/0416* (2013.01); *G06F 1/3215* (2013.01); *G06F 1/3265* (2013.01); *G06F 3/0488* (2013.01); *H04M 2250/22* (2013.01); *H04R 3/02* (2013.01); *Y02B 60/1242* (2013.01)

(58) Field of Classification Search
CPC ............ G06K 9/00335; G06K 1/3215; G06K 1/3265; G06F 3/017
USPC ....................................................... 345/173
See application file for complete search history.

(56) References Cited

U.S. PATENT DOCUMENTS

| 5,649,321 | A | * | 7/1997 | Kellenberger | ................. 455/221 |
| 5,856,822 | A | * | 1/1999 | Du et al. | ........................... 345/73 |
| 6,516,068 | B1 | * | 2/2003 | Ciurpita et al. | ................ 381/106 |
| 2007/0085157 | A1 | | 4/2007 | Fadell et al. | |
| 2008/0036743 | A1 | * | 2/2008 | Westerman et al. | ........... 345/173 |

(Continued)

OTHER PUBLICATIONS

Examiner's Report dated Jul. 19, 2013, issued in respect of corresponding Canadian Patent Application No. 2,761,191.

(Continued)

*Primary Examiner* — Alexander Beck
*Assistant Examiner* — Charles Zheng
(74) *Attorney, Agent, or Firm* — Geoffrey deKleine; Borden Ladner Gervais LLP

(57) ABSTRACT

A method of controlling a portable electronic device includes detecting a touch on a touch-sensitive display, adjusting a first threshold based on detected conditions during the touch, comparing a value related to the touch on the touch-sensitive display to the first threshold, and when the value related to touch meets the first threshold, turning off the display.

20 Claims, 5 Drawing Sheets

(56) References Cited

U.S. PATENT DOCUMENTS

| | | |
|---|---|---|
| 2008/0042994 A1 | 2/2008 | Gillespie et al. |
| 2008/0090617 A1 | 4/2008 | Sutardja |
| 2008/0158146 A1 | 7/2008 | Westerman |
| 2008/0167834 A1* | 7/2008 | Herz et al. ............ 702/150 |
| 2009/0116666 A1 | 5/2009 | Ranta |
| 2009/0327886 A1* | 12/2009 | Whytock et al. ............ 715/702 |

OTHER PUBLICATIONS

International Search Report dated Aug. 12, 2010, issued in respect of corresponding International Patent Application No. PCT/CA2010/000941.

* cited by examiner

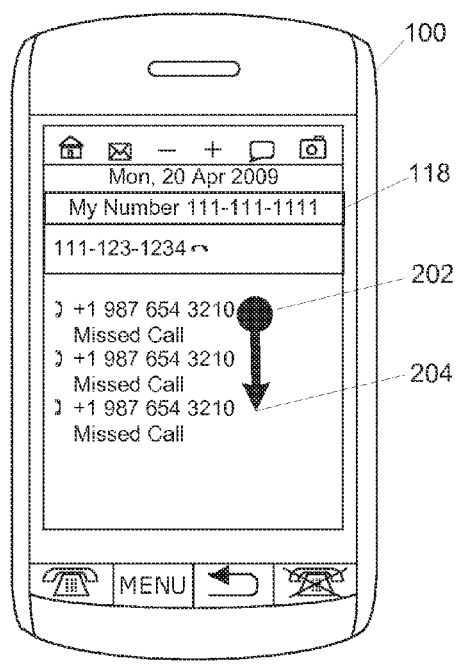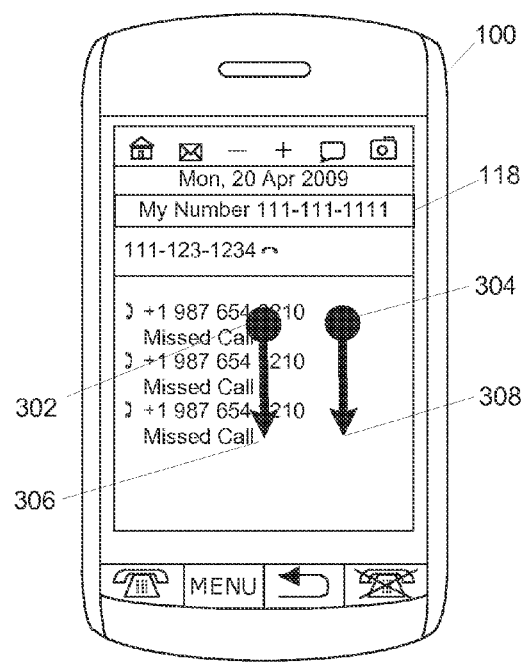
FIG. 2
FIG. 3

PORTABLE ELECTRONIC DEVICE INCLUDING TOUCH-SENSITIVE DISPLAY AND METHOD OF DETERMINING WHEN TO TURN OFF THE TOUCH SENSITIVE DISPAY

CROSS-REFERENCE TO RELATED APPLICATION

This application is a Continuation of U.S. patent application Ser. No. 12/817,984, filed Jun. 17, 2010, which claims the benefit of U.S. Provisional Patent Application 61/218,715, filed Jun. 19, 2009, the entire content of which is incorporated herein by reference.

FIELD OF TECHNOLOGY

The present disclosure relates to portable electronic devices including touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in electronic devices with touch-sensitive devices are desirable.

BRIEF DESCRIPTION OF THE DRAWINGS

FIG. 2 and FIG. 3 illustrate examples of gestures on a touch-sensitive display of the portable electronic device, in accordance with the present disclosure.

DETAILED DESCRIPTION

Figure 1:
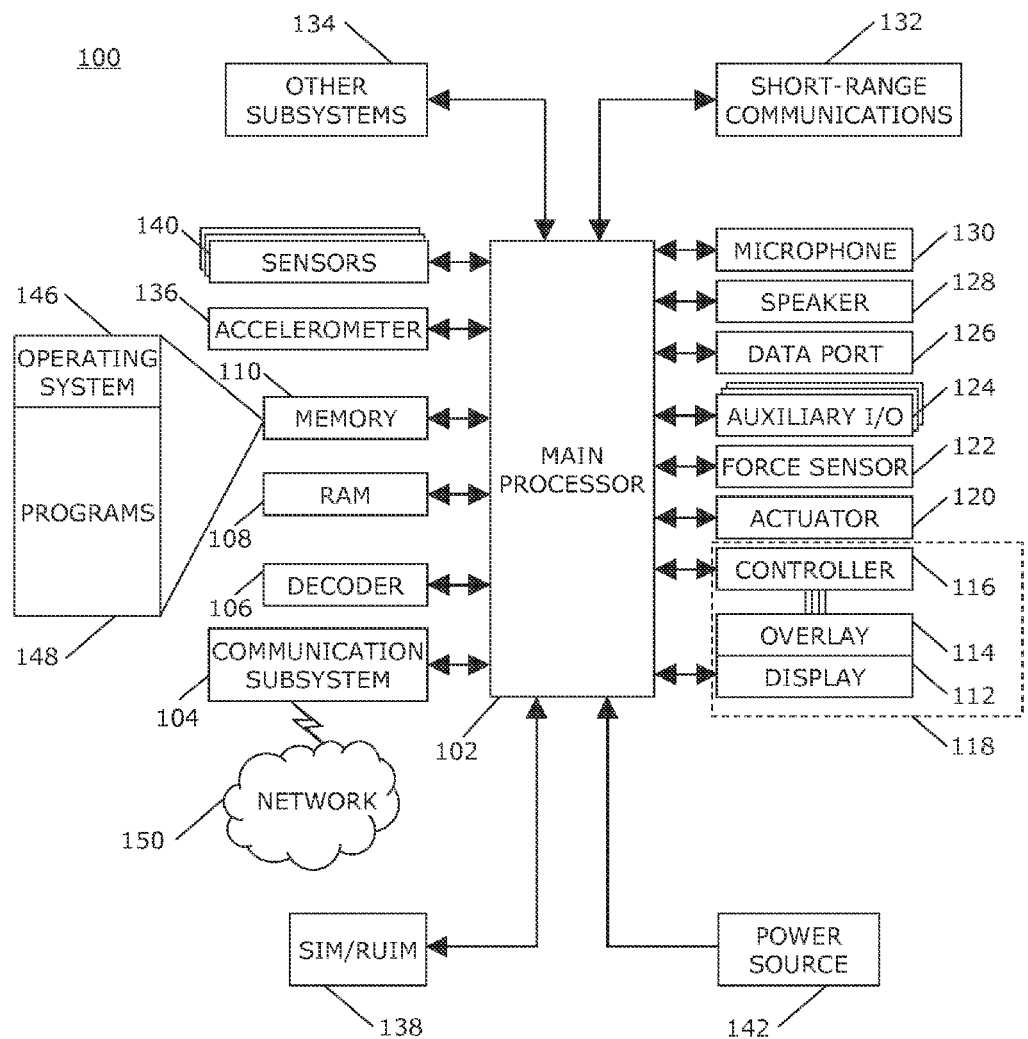
FIG. 1 is a block diagram of a portable electronic device in accordance with the present disclosure.

The following describes an apparatus for and method of controlling a portable electronic device. A touch on a touch-sensitive display is detected and a first threshold is adjusted based on detected conditions during the touch. A value related to the touch on the touch-sensitive display is compared to the first threshold and when the value related to touch meets the first threshold, the display is turned off.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably coupled to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces. The processor 102 may also interact with sensors 140. The sensors 140 may include, for example, a light sensor to determine ambient lighting conditions. The sensors 140 may include an active leak microphone to determine the audible noise from the speaker 128. The sensors 140 may also include a proximity sensor such as an infrared proximity detector that includes an infrared LED and infrared detector to detect objects in near proximity.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display may include a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The actuator(s) 120 may be depressed by applying sufficient force to the touch-sensitive display 118 to overcome the actuation force of the actuator 120. The actuator 120 may be actuated by pressing anywhere on the touch-sensitive display 118. Input may be provided to the processor 102 when the actuator 120 is actuated. Actuation of the actuator 120 may result in provision of tactile feedback.

A mechanical dome switch actuator may be utilized. In this example, tactile feedback is provided when the dome collapses due to imparted force and when the dome returns to the rest position after release of the switch.

Alternatively, the actuator 120 may comprise one or more piezoelectric (piezo) actuators that provide tactile feedback for the touch-sensitive display 118. Contraction of the piezo actuator(s) applies a spring-like force, for example, opposing a force externally applied to the touch-sensitive display 118. Each piezo actuator includes a piezo device, such as a piezoelectric disk, adhered to a substrate, such as a metal substrate. The substrate bends when the piezo device contracts due to build up of charge/voltage across the piezo device or in response to a force, such as an external force applied to the touch-sensitive display 118. The charge/voltage may be adjusted by varying the applied voltage or current, thereby controlling the force applied by the piezo actuators. The charge/voltage across the piezo devices may be removed by a controlled discharge current/voltage that causes the piezo devices to expand, decreasing the force applied by the piezo actuators. The charge/voltage may advantageously be removed over a relatively short period of time to provide tactile feedback to the user. Absent an external force and absent a charge/voltage across the piezo device, the piezo device may be slightly bent due to a mechanical preload.

An example of a touch-sensitive display 118 and touches on the sensitive display 118 are shown in FIG. 2 and FIG. 3. The touch-sensitive display 118 is also configured to receive and detect a gesture such as a swipe on the touch-sensitive display 118. A swipe, also known as a flick, is a type of gesture on a touch-sensitive display 118 that begins at an origin point 202 and continues to a finishing point 204. A swipe may be long or short in distance and/or duration. Two points of the swipe may be utilized to determine a vector that describes a direction of the swipe. The touch-sensitive display 118 is also configured to receive and detect a multiple touch gesture such as a two-finger swipe that begins at two origin points 302, 304 and continues to two finishing points 306, 308.

The controller 116 and/or the processor 102 are configured to determine a value that is related to the size of contact of the touch on the touch-sensitive display 118 such that a larger area of contact on the touch-sensitive display results in a greater value. The value related to the size of the touch, referred to herein as the size of the touch, may be an area or a dimension of the touch, such as a width or height of the touch. The value may also be related to the capacitive coupling of the finger or conductive object with the touch-sensitive overlay 114 of the touch-sensitive display 118. When a touch is received on the touch-sensitive display 118, the touch is detected and the size of the touch (the value related to the size of the touch) is determined. The size of the touch is determined for a single touch in which a single finger or object touches the touch-sensitive display 118 at one location and for multiple touches on the touch-sensitive display 118 at the same time, including a two-finger gesture.

The touch-sensitive display may or may not be configured to accurately distinguish touch locations, for example, for two touches that begin simultaneously. When a touch is received at the touch-sensitive display 118, an accuracy level may be determined based on the touch received and the accuracy of the touch-sensitive display 118 when determining the location(s) of the touch(es). The accuracy levels may be, for example, accurate and approximate. When the location(s) of the touch(es) on the touch-sensitive display 118, as determined at the controller 116 and the processor 102, may be inaccurate, the accuracy level is determined to be approximate. For example, when two touches begin simultaneously and the touch-sensitive display is not configured to accurately distinguish the touch locations, the controller 116 and/or the processor 102 may not correctly resolve the touch locations because, e.g., the x and y coordinates may be incorrectly paired, and the accuracy level is approximate. When a single touch is detected or when two touches that do not begin simultaneously are detected and the touch locations are resolved, the controller 116 and/or the processor 102 may determine that the accuracy level is accurate.

To save battery power at the portable electronic device 100, the display 112, including the LCD and/or the backlight, may be configured to turn off when input, such as a touch on the touch-sensitive display 114 or other suitable input, is not received for a period of time. For example, when no input is received for a period of time, such as 20 seconds, the display 112 may be turned off. Turning off the display 112 includes putting the display 112 and/or device 100 in a sleep or reduced power mode, for example, when no information is displayed, e.g., the display is darkened or completely dark, and/or other power-saving processes are activated. Such power-saving processes may include reducing a sample rate at which the controller 116 obtains data from the touch-sensitive display 118 or discontinuing or reducing the frequency of processes that apply to the touch-sensitive display 118, the display 112, or the device 100 in general. Turning off the display 112 may simply include turning off all processes of the device 100 except for a wake-up process that turns on the device 100 and the display 112. An input received on the touch-sensitive display 114, for example, wakes up the device 100, e.g., by powering on the display 112. The input may also start a timer or reset the timer when the display is already on. The timer may be any suitable timer that begins timing until another input is received or until the threshold period of time has passed, at which time the display turns off. The operation of turning on the display 112 and starting the timer when a touch is received on the touch-sensitive overlay 114 is referred to as waking up the portable electronic device 100. The wake-up may be turned off or modified such that a touch at the touch-sensitive display 118, when the display 112 is turned off, does not wake up the portable electronic device 100 and the display 112 remains off.

When in an active phone call, e.g., during a telephone call, the size of the touch may be utilized to determine when the touch is very unlikely to be a user's face touching the touch-sensitive display 118, referred to herein as "not a face touch," or when a touch on the touch-sensitive display 118 may be a user's face, referred to herein as a "possible face touch" or a "face touch." A very small size of the touch is unlikely to be a face touch, while a larger size of touch may be a face touch. When the size of the touch is below a low threshold, the touch is determined to not be a face touch. The low threshold is set suitably low, e.g., little chance of a user's face touching the touch-sensitive display 118, and a size of the touch below the low threshold is not determined to be a possible face touch. A touch may be categorized into a possible face touch and not a face touch based on a comparison of size of the touch to a low threshold value.

The processor 102 may be configured to maintain and adjust a threshold size to facilitate identification of a touch contact, e.g., of a user's face on the touch-sensitive display 118, as a face touch when the portable electronic device 100 is in an active phone call. The size of the touch may be compared to the threshold size to facilitate the identification of a face touch and the threshold size may be adjusted by increasing the threshold size or decreasing the threshold size based on the conditions when the touch is detected. The threshold size may be any suitable value for comparison of the size of the touch to the threshold size. The threshold size may be adjusted, for example, based on the accuracy level of the touch-sensitive display 118, a duty cycle or fraction of an interval during which a touch occurs, an audio level at the microphone 130, an input from the accelerometer 136 based on a detected motion, input from one or more of the sensors 140, or any combination of conditions.

Figure 4:
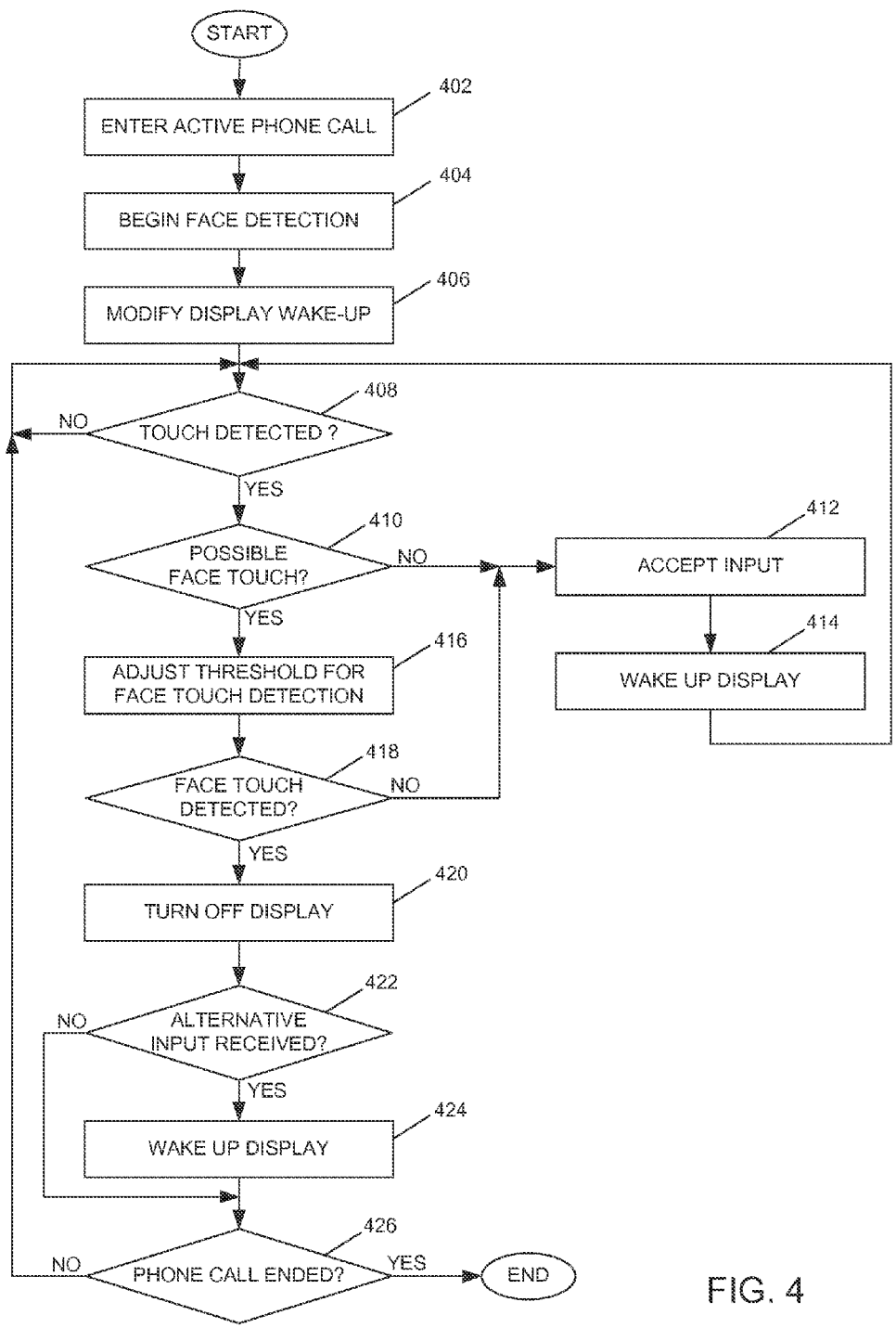
FIG. 4 is a flowchart illustrating a method of controlling the portable electronic device to detect a face touch, in accordance with the present disclosure.

FIG. 4 is a flowchart illustrating a method of controlling a portable electronic device 100. The method may be carried out by the processor 102 performing stored instructions from a computer-readable medium, such as described above. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium.

The portable electronic device 100 enters 402 an active phone call when, for example, a phone call is received or placed from the portable electronic device 100 and face detection begins 404. The wake-up is modified 406 such that a touch on the touch-sensitive display 118, which touch is determined to be a face touch, does not wake up the portable electronic device 100 when face detection begins. When a touch is detected 408, the attributes of the touch are determined including, e.g., location, size of the touch, and the accuracy level. When a touch is detected, the process continues at 410, where the size of the touch is compared to the low threshold to determine whether the touch is a possible face touch. When the size of the touch does not meet the low threshold at 410, the touch is not a face touch. A value meets a threshold when the value is equal to or exceeds the threshold. When the size of the touch meets a low threshold at 410, the touch is not a face touch and the touch is accepted as an input 412, the display 112 wakes up 414, and the process continues at 408. When the touch is a possible face touch, the threshold size may be adjusted 416 based on the conditions when the touch is detected. The size of the touch is compared to the threshold size to determine 418 when the size of the touch meets the threshold size, which is referred to herein as detecting a face touch. A face touch is not detected when the size of the touch does not meet the threshold size. When a face touch is not detected, the touch is accepted as an input 412, the display wakes up 414, and the method continues at 408. When a face touch is detected, the display 112 is turned off 420, if the display 112 is not already turned off, and the touch contact does not wake up the display 112/device 100. When a further input is received at 422, such as input from a further touch or input received when an actuator 120 is actuated, the display 112/device 100 wakes up 424, if the display 112/device 100 is not already turned on. When the phone call ends at 424, the process ends. When the phone call continues at 424, the process continues at 408.

Optionally, the rate, or frequency, the process from 408 through 426 is carried out may be dependent on whether a face is detected at 418. For example, the process may be faster and the threshold size may be adjusted more frequently when a face is not detected compared to the rate when the face is detected.

Figure 5:
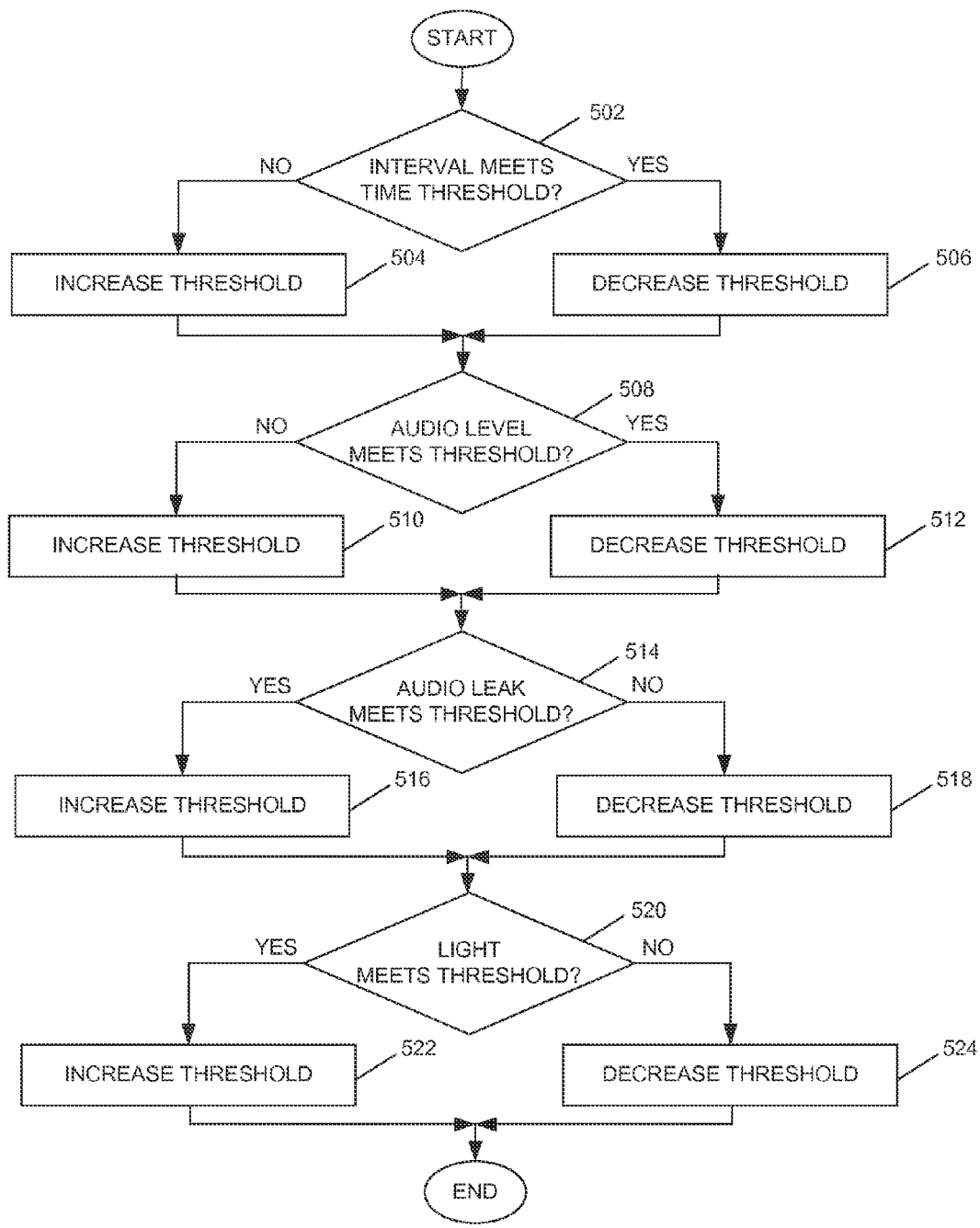
FIG. 5 is a flowchart illustrating a method of adjusting a threshold, in accordance with the present disclosure.

A flowchart illustrating a method of adjusting the threshold size according to one example is shown in FIG. 5. The method may be carried out by computer-readable code executed, for example, by the processor 102. Computer-readable code executable by at least one processor of the portable electronic device to perform the method may be stored in a computer-readable medium. Coding of software for carrying out such a method is within the scope of a person of ordinary skill in the art given the present description. The method may contain additional or fewer processes than shown and/or described, may be performed in a different order, and may be separate processes. Computer-readable code executable by at least one processor of the portable electronic device to perform the method may be stored in a computer-readable medium.

For each touch on the touch-sensitive display 112, a time interval during which touch contact is maintained on the touch-sensitive display may be determined. This interval may be a contiguous period of time or two or more periods of time in a window, e.g., 3 seconds, which may be referred to as a duty cycle of the touch. The interval during which a touch is detected may be determined and compared to a time threshold, for example, 1.5 seconds, when in the active phone call. The interval may be an indicator of whether the touch is a face touch and is higher when the interval meets the time threshold than when the interval does not meet the time threshold. When the interval during which a touch is detected does not meet the time threshold, the threshold size is increased 504. When the interval during which a touch is detected meets the time threshold, the threshold size is decreased 506.

The microphone 130 and processor 102 may be configured to determine an audio level from the audible information that is received at the microphone 130 and converted into electrical signals. The audio level may be compared to an audio level threshold at 508. When the audio level meets the audio level threshold, the user is likely closer to the microphone than when the audio level does not meet the audio level threshold. When the audio level does not meet the audio level threshold at 508, the threshold size is increased 510. When the audio level meets the audio level threshold, the threshold size is decreased 512.

The portable electronic device 100 may also include an active leak microphone to detect audible noise from the speaker 128 that is picked up at the active leak microphone and the level of audible noise is compared to a threshold level. A high level of audible noise from the speaker 128 may indicate that the speaker 128 is not held against the ear of a user while a relatively low level of audible noise from the speaker 128 may indicate that the speaker 128 is likely held against the ear of the user, thereby reducing the leaked audible noise. When the level of audible noise picked up at the active leak microphone meets a noise level threshold at 514, the threshold size is increased 516. When the level of audible noise picked up at the active leak microphone does not meet the noise level threshold at 514, the threshold size is decreased 518.

The touch-sensitive display 118 may include a light sensor for determining ambient lighting conditions and adjusting a backlight of the display 112 based on the ambient lighting conditions. For example, backlighting may be increased when the portable electronic device 100 is used in a very bright location such as in a bright room or outside on a sunny day. Conversely, backlighting may be decreased when the portable electronic device 100 is used in a dark location. The level of light at the light sensor is compared to a light level threshold, and when the level of light meets the light level threshold at 520, the threshold size is increased 522. When the level of light does not meet the light level threshold at 520, the threshold size is decreased 524.

Figure 6:
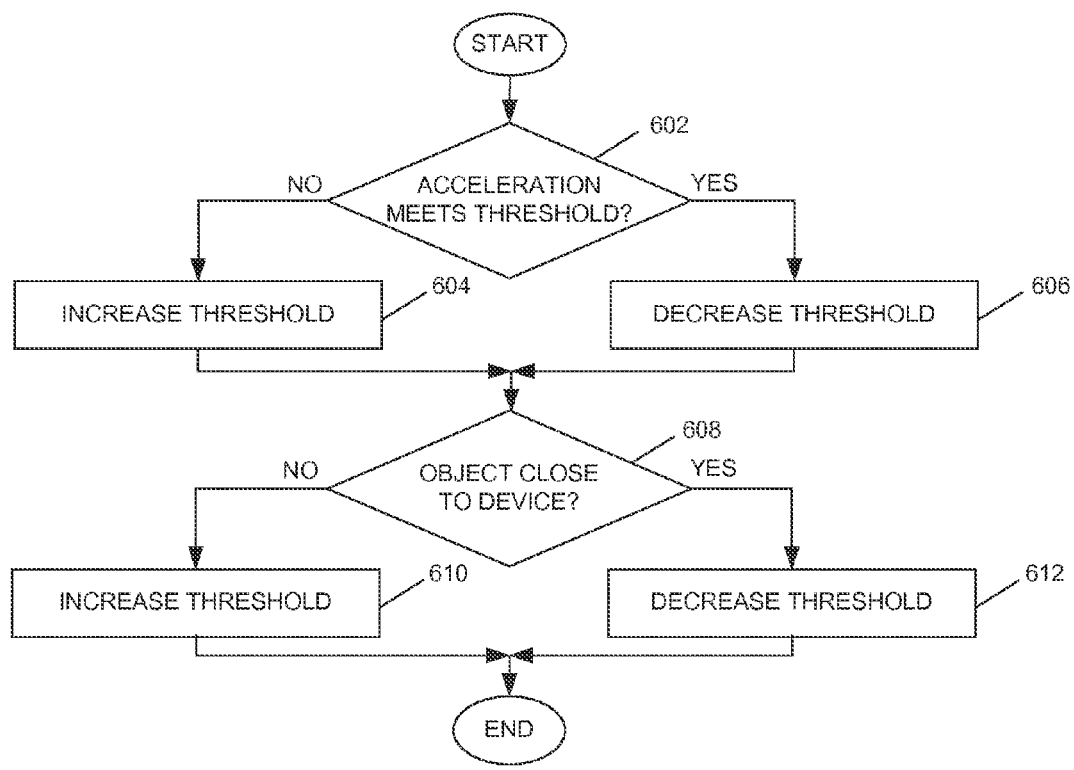
FIG. 6 is a flowchart illustrating another method of adjusting a threshold, in accordance with the present disclosure.

A flowchart illustrating another method of adjusting the threshold size according to one example is shown in FIG. 6. The method may be carried out by computer-readable code executed, for example, by the processor 102. Computer-readable code executable by at least one processor of the portable electronic device to perform the method may be stored in a computer-readable medium. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium.

The accelerometer 136 and the processor 102 may be configured detect a motion or motions, including a motion of the portable electronic device 100 during lifting from a starting position, such as a non-moving position, to a position near an ear of the user. Input from an accelerometer may be buffered such that previously received input may be utilized when a touch is detected. For example, input over a time period, such as a 3 seconds, prior to detecting a touch, may be utilized to adjust the threshold size. The signals from the accelerometer are utilized to determine any acceleration that occurred over the time period at 602. The threshold size is decreased 606 when the maximum acceleration over the period of time meets a threshold value. The threshold size may be increased 604 when the maximum acceleration over the period time does not meet the threshold value.

The portable electronic device 100 may also include a proximity detector. Objects that are in close proximity to the infrared proximity detector are detected based on reflection of infrared light emitted from the LED. When an object is detected 608 in close proximity to the portable electronic device 100, the threshold size is decreased 612. An object may be determined to be in close proximity when the object is within a predetermined distance of the proximity sensor. When an object is not detected 608 in close proximity to the portable electronic device 100, the threshold size is increased 610.

Input, for example, from the proximity detector, may be collected at a variable rate that is based on whether the detected object distance is generally consistent. Pulses of infrared light may be emitted and detected more frequently when a change is determined from one detected pulse to the next detected pulse. The pulses of infrared light may be emitted and detected less frequently when a generally consistent distance is detected for a predetermined number of pulses. The pulses of infrared light may be further reduced when an object is detected in close proximity for a predetermined number of pulses. For example, when a generally consistent distance is detected for a predetermined number of pulses, a rate of one pulse every 100 ms may be utilized. When a change is detected between pulses, the rate may change to one pulse every 20 ms. The proximity of an object may be utilized to change the threshold value when a generally consistent distance is detected for the predetermined number of pulses.

Optionally, input from an accelerometer may be compared to known input for a motion for lifting the portable electronic device 100 to the ear of the user to identify motions that may be a movement of the portable electronic device 100 from a start position to a position close to the user's face. The threshold size may be decreased when a motion that may be a movement of the portable electronic device 100 to the user's face is identified.

FIG. 5 and FIG. 6 show examples of factors that may be utilized to adjust the threshold size. The process is not limited to the factors shown in FIG. 5 and FIG. 6. Other factors and other combinations of factors may also be utilized. For example, the accuracy level may be utilized and the threshold size may be decreased when the accuracy level is determined to be approximate or increased when the accuracy level is determined to be accurate. These factors may be processed serially, in parallel, or any combination thereof.

In the examples described above, the threshold size is decreased when the condition measured indicates an increased probability that touch contact is a face touch on the touch-sensitive display 118 and is increased when the condition measured indicates a decreased probability that the touch contact is a face touch. When the size of the touch is below the threshold size, the touch is unlikely a face touch. Conversely, when the size of the touch is above the threshold size, the touch is likely a face touch. When the condition or conditions, based on which the threshold size is adjusted, indicate that a touch is likely a face touch, the threshold size is lowered and a face touch may be determined for a smaller area of contact.

A method of controlling a portable electronic device includes detecting a touch on a touch-sensitive display, adjusting a threshold value for determining face detection based on detected conditions, comparing a value related to area of touch contact on the touch-sensitive display to the threshold value, determining that the touch is a face touch based on the comparison.

A portable electronic device includes a touch-sensitive display, and a processor operably coupled to the touch-sensitive display. The processor is configured to carry out the above method.

The control of the portable electronic device for detecting a face touch facilitates device power-saving as a display may be turned off and remain off when a face touch is detected on the touch-sensitive display. Further, selection of features or objects on the touch-sensitive display may be inhibited to reduce the chance of unwanted selection of features or objects as a result of the face touch during a telephone conversation. The adjustment of a threshold value based on detected conditions obviates the need for complex presence-detecting devices such as a proximity sensor and facilitates correct detection of a face as a value related to an area of contact is not relied upon in isolation. Multiple factors are therefore taken into account to detect a face touch.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
   detecting a touch on a touch-sensitive display of a portable electronic device;
   maintaining a first threshold size value for comparing to a contact area value for the touch on the touch-sensitive display;
   in response to detecting the touch:
      adjusting by increasing or decreasing the first threshold size value based on at least two of:
         a time duration during which the touch is detected by the touch-sensitive display and touch contact is maintained on the touch-sensitive display;
         an audio level detected at a microphone of the electronic device;
         a level of audible noise detected at an active leak microphone of the electronic device;
         a light level detected at a light sensor of the electronic device;
      comparing the contact area value for the touch to the first threshold size value; and
      when the contact area value for the touch meets the first threshold size value, turning off the touch-sensitive display.

2. The method according to claim 1, wherein detecting comprises determining that the touch is a face touch when the value meets the first threshold size value.

3. The method according to claim 1, comprising accepting input when the contact area value does not meet a second threshold, prior to adjusting the first threshold size value.

4. The method according to claim 3, wherein the second threshold is lower than the first threshold size value.

5. The method according to claim 1, wherein adjusting the first threshold is carried out in response to determining that the contact area value for the touch meets a second threshold prior to adjusting the first threshold size value.

6. The method according to claim 1, comprising accepting the touch as a touch input when the contact area value for the touch does not meet a low threshold, prior to adjusting the first threshold size value.

7. The method according claim 1, comprising entering an active phone call prior to detecting the touch on the touch-sensitive display.

8. The method according to claim 1, comprising turning off a display wake-up that is responsive to touches detected on the touch-sensitive display in response to determining that the contact area value for the touch meets the first threshold.

9. The method according to claim 1, wherein adjusting the first threshold size value comprises adjusting the first threshold size value based on an accuracy level of the touch-sensitive display when the touch is detected.

10. The method according to claim 9, wherein the first threshold size value is decreased when the accuracy level is approximate.

11. The method according to claim 9, wherein the first threshold size value is increased when the accuracy level is accurate.

12. The method according to claim 1, wherein adjusting the first threshold size value comprises lowering the first threshold size value when the time during which touch contact is maintained meets a time threshold.

13. The method according to claim 1, wherein adjusting the first threshold size value comprises lowering the first threshold size value when the audio level meets an audio level threshold.

14. The method according to claim 1, wherein adjusting the first threshold size value comprises increasing the first threshold size value when the level of noise detected at the active leak microphone meets a threshold level.

15. The method according to claim 1, wherein adjusting the first threshold size value comprises decreasing the first threshold size value when the level of noise detected at the active leak microphone does not meet a threshold level.

16. The method according to claim 1, wherein adjusting the first threshold size value comprises decreasing the first threshold size value when the light level does not meet a light level threshold.

17. The method according to claim 1, wherein adjusting the first threshold size value comprises increasing the first threshold when the light level meets a light level threshold.

18. The method according to claim 1, wherein adjusting the first threshold size value comprises adjusting based on an input from an accelerometer of the portable electronic device.

19. A non-transitory computer-readable medium having computer-readable code embodied therein, the computer-readable code executable by a processor of the portable electronic device to perform the method according to claim 1.

20. An electronic device comprising the touch-sensitive display and a processor operably coupled to the touch-sensitive display and configured to perform the method of claim 1.

* * * * *